(12) United States Patent
Robinson et al.

(10) Patent No.: US 11,001,377 B1
(45) Date of Patent: May 11, 2021

(54) AIRCRAFT AIRFOIL AND AIRCRAFT HAVING THE SAME

(71) Applicant: Horizon Aircraft Inc., Lindsay (CA)

(72) Inventors: Eric Brian Robinson, City of the Kawartha Lakes (CA); Eric Brandon Robinson, Whitby (CA)

(73) Assignee: HORIZON AIRCRAFT INC., Lindsay (CA)

( * ) Notice: Subject to any disclaimer, the term of this patent is extended or adjusted under 35 U.S.C. 154(b) by 0 days.

(21) Appl. No.: 16/880,610

(22) Filed: May 21, 2020

(51) Int. Cl.
*B64C 29/00* (2006.01)
*B64C 3/26* (2006.01)
*B64C 11/00* (2006.01)
*B64C 3/38* (2006.01)
*B64C 3/32* (2006.01)
*B64C 3/18* (2006.01)

(52) U.S. Cl.
CPC .......... *B64C 29/0025* (2013.01); *B64C 3/187* (2013.01); *B64C 3/26* (2013.01); *B64C 3/32* (2013.01); *B64C 3/38* (2013.01); *B64C 11/001* (2013.01); *B64C 29/00* (2013.01); *B64C 29/0016* (2013.01)

(58) Field of Classification Search
CPC .... B64C 3/32; B64C 3/38; B64C 3/24; B64C 11/001; B64C 27/20; B64C 29/00; B64C 29/0016; B64C 29/0025
See application file for complete search history.

(56) References Cited

U.S. PATENT DOCUMENTS

| | | | |
|---|---|---|---|
| 5,868,355 A * | 2/1999 | Carter, Jr. ............... | B63B 19/08 114/117 |
| 6,860,449 B1 * | 3/2005 | Chen ......................... | B64B 1/06 244/12.1 |
| 2017/0334582 A1 * | 11/2017 | Huang ...................... | B64F 5/60 |
| 2019/0023389 A1 * | 1/2019 | Murrow .................... | B64C 3/38 |

* cited by examiner

*Primary Examiner* — Nicholas McFall
(74) *Attorney, Agent, or Firm* — Millman IP Inc.

(57) ABSTRACT

An aircraft airfoil disclosed herein has a forward skin structure at least partially defining a leading edge of the airfoil and an aft skin structure at least partially defining a trailing edge of the airfoil. At least one of the forward skin structure and the aft skin structure is movable relative to the other of the forward skin structure and the aft skin structure between a closed position, in which at least one thrust fan positioned between the leading edge and the trailing edge is at least partially covered, and an open position, in which the at least one thrust fan is less covered than in the closed position.

28 Claims, 8 Drawing Sheets

AIRCRAFT AIRFOIL AND AIRCRAFT HAVING THE SAME

FIELD

The invention relates to the field of aircraft, and, more particularly, to an aircraft airfoil, and an aircraft having the same.

BACKGROUND OF THE DISCLOSURE

Aircraft designed to takeoff, hover, and land vertically or substantially vertically have inspired generations of aerospace designers since Sikorsky's first helicopter took flight in September of 1939. Traditionally, these designs were limited to helicopter-type configurations that have a single large rotor, or, in some cases, two large rotors. However, with the systematic improvement in lightweight aerospace materials, battery and electric motor technology, and ducted fans, new vertical take-off and landing ("VTOL") or short take-off and landing ("STOL") designs are becoming practical.

Modern VTOL or STOL designs often leverage this new distributed propulsion schema wherein lifting fans are positioned in idealized locations around or within an aircraft and are powered by electric motors connected to highly dense energy sources. These fans are often oriented so that their thrust vector is vertically or substantially vertically downward, with instances of upward thrust useful in some airfoil applications, and act by drawing air in through an inlet whereby a fan or propeller propels the air mass. The reactionary force concordantly produces a thrust vector to lift the aircraft vertically from the ground, arrest downward velocity, or otherwise produce aerodynamic balancing forces. When the aircraft is at a desired height, the aircraft may employ one or more power systems to generate forward thrust to begin moving horizontally.

One such schema that has been investigated is to place lift fans within the airfoils, canards or body of a VTOL or STOL aircraft. This has been attempted by many leading aerospace agencies beginning in the early 1960s. However, this configuration has been historically very challenging. Many aerodynamic and structural problems manifest with high-power fans embedded and operating within the airfoils (e.g., wings, canards, and empennage) and/or fuselage of an aircraft. These problems include airflow disturbance at the fan inlets that reduce efficiency, complex pitching moments during transition to and from forward flight, high drag forces during forward flight due to the open-duct free-stream airflow interference, reduction in fan thrust nearing the ground, and other structural problems related to lift fans and their supporting architecture.

Attempts to cover the lift fans with louvres, doors or other such devices have proven complex, heavy, inefficient, and generally contribute to significant aerodynamic challenges.

SUMMARY OF THE DISCLOSURE

In an aspect, there is provided an aircraft airfoil comprising a forward skin structure at least partially defining a leading edge of the airfoil and an aft skin structure at least partially defining a trailing edge of the airfoil, at least one of the forward skin structure and the aft skin structure being movable relative to the other of the forward skin structure and the aft skin structure between a closed position, in which at least one thrust fan positioned between the leading edge and the trailing edge is at least partially covered, and an open position, in which the at least one thrust fan is less covered than in the closed position.

The forward skin structure and the aft skin structure can be positioned adjacent one another along a seam in the closed position. The seam can extend at least partially spanwise along the airfoil. At least one of the forward skin structure and the aft skin structure can have an interlocking feature for engaging the other of the forward skin structure and the aft skin structure to limit relative movement of the forward skin structure and the aft skin structure when in the closed position.

Each of the forward skin structure and the aft skin structure can move relative to the at least one thrust fan between the closed position and the open position.

The at least one thrust fan can be mounted on a frame over which the at least one of the forward skin structure and the aft skin structure move. The frame can have a set of channels extending normal or oblique to a spanwise axis of the airfoil in which are positioned a set of guide arms of the at least one of the forward skin structure and the aft skin structure. The frame can have a pair of spanwise-extending members having pairs of ribs spanning therebetween, each pair defining one of the set of channels therebetween. The at least one of the forward skin structure and the aft skin structure can have at least one set of engagement features that is engaged and driven by at least one pinion gear, the at least one pinion gear being driven by at least one drive shaft.

An axial projection of the fan disk of along a rotational axis of each of the at least one thrust fan can be uninterrupted by the forward skin structure and the aft skin structure when in the open position.

Each of the at least one thrust fan can be fully covered when the forward skin structure and the aft skin structure are in the closed position.

The aircraft airfoil can further comprise an additional forward skin structure at least partially defining the leading edge of the airfoil and an additional aft skin structure at least partially defining the trailing edge of the airfoil, at least one of the additional forward skin structure and the additional aft skin structure being movable relative to the other of the additional forward skin structure and the additional aft skin structure between a closed position, in which at least one additional thrust fan of the airfoil is at least partially covered, and an open position, in which the at least one additional thrust fan is less covered than in the closed position.

The at least one thrust fan and the at least one additional thrust fan can be mounted on a frame, wherein each of the forward skin structure and the aft skin structure moves relative to the frame between the closed position and the open position, wherein each of the additional forward skin structure and the aft skin structure moves relative to the frame between the closed position and the open position, and wherein each of the forward skin structure, the aft skin structure, the additional forward skin structure, and the additional aft skin structure has at least one set of engagement features that is driven by at least one pinion gear, the at least one pinion gear being driven by at least one pinion gear drive shaft.

At least one of the forward skin structure and the aft skin structure can move relative to a fuselage along at least one of a linear path, an arcuate path, a complex path, and a convolute path.

In another aspect, there is provided an aircraft comprising an airfoil having a forward skin structure at least partially defining a leading edge of the airfoil and an aft skin structure at least partially defining a trailing edge of the airfoil, at least one of the forward skin structure and the aft skin structure being movable relative to the other of the forward skin structure and the aft skin structure between a closed position, in which at least one thrust fan positioned between the leading edge and the trailing edge is at least partially covered, and an open position, in which the at least one thrust fan is less covered than in the closed position.

The forward skin structure and the aft skin structure can be positioned adjacent one another along a seam in the closed position. The seam can extend at least partially spanwise along the airfoil. At least one of the forward skin structure and the aft skin structure can have an interlocking feature for engaging the other of the forward skin structure and the aft skin structure to limit relative movement of the forward skin structure and the aft skin structure when in the closed position.

Each of the forward skin structure and the aft skin structure can move relative to the at least one thrust fan between the closed position and the open position.

The at least one thrust fan can be mounted on a frame over which the at least one of the forward skin structure and the aft skin structure move. The frame can have a set of channels extending normal or oblique to a spanwise axis of the airfoil in which are positioned a set of guide arms of the at least one of the forward skin structure and the aft skin structure. The frame can have a pair of longitudinal members having pairs of ribs spanning therebetween, each pair defining one of the set of channels therebetween. The at least one of the forward skin structure and the aft skin structure can have at least one set of engagement features that is driven by at least one pinion gear, the at least one pinion gear being driven by at least one pinion gear drive shaft.

An axial projection of the fan disk of along a rotational axis of each of the at least one thrust fan can be uninterrupted by the forward skin structure and the aft skin structure when in the open position.

Each of the at least one thrust fan can be fully covered when the forward skin structure and the aft skin structure are in the closed position.

The aircraft can further comprise an additional forward skin structure at least partially defining the leading edge of the airfoil and an additional aft skin structure at least partially defining the trailing edge of the airfoil, at least one of the additional forward skin structure and the additional aft skin structure being movable relative to the other of the additional forward skin structure and the additional aft skin structure between a closed position, in which at least one additional thrust fan of the airfoil is at least partially covered, and an open position, in which the at least one additional thrust fan is less covered than in the closed position.

The at least one thrust fan and the at least one additional thrust fan can be mounted on a frame, wherein each of the forward skin structure and the aft skin structure moves relative to the frame between the closed position and the open position, wherein each of the additional forward skin structure and the aft skin structure moves relative to the frame between the closed position and the open position, and wherein each of the forward skin structure, the aft skin structure, the additional forward skin structure, and the additional aft skin structure has at least one set of engagement features that is driven by at least one pinion gear, the at least one pinion gear being driven by at least one pinion gear drive shaft.

At least one of the forward skin structure and the aft skin structure can move relative to a fuselage along at least one of a linear path, an arcuate path, a complex path, and a convolute path.

In a further aspect, there is provided an aircraft airfoil comprising at least one forward skin structure at least partially defining a leading edge of the airfoil and at least one aft skin structure at least partially defining a trailing edge of the airfoil, at least one of the at least one forward skin structure and the at least one aft skin structure being movable relative to the other of the at least one forward skin structure and the at least one aft skin structure between a closed position, in which at least one thrust fan positioned between the leading edge and the trailing edge is at least partially covered, and an open position, in which the at least one thrust fan is less covered than in the closed position.

The at least one forward skin structure and the at least one aft skin structure can be positioned adjacent one another along a seam in the closed position. The seam can extend at least partially spanwise along the airfoil. At least one of the at least one forward skin structure and the at least one aft skin structure can have an interlocking feature for engaging the other of the at least one forward skin structure and the at least one aft skin structure to limit relative movement of the at least one forward skin structure and the at least one aft skin structure when in the closed position.

Each of the at least one forward skin structure and the at least one aft skin structure can move relative to the at least one thrust fan between the closed position and the open position.

The at least one thrust fan can be mounted on a frame over which the at least one of the forward skin structure and the aft skin structure move. The frame can have a set of channels extending normal or oblique to a spanwise axis of the airfoil in which are positioned a set of guide arms of the at least one of the at least one forward skin structure and the at least one aft skin structure. The frame can have a pair of longitudinal members having pairs of ribs spanning therebetween, each pair defining one of the set of channels therebetween. The at least one of the at least one forward skin structure and the at least one aft skin structure can have at least one set of engagement features that is driven by at least one pinion gear, the at least one pinion gear being driven by at least one pinion gear drive shaft.

An axial projection of the fan disk of along a rotational axis of each of the at least one thrust fan can be uninterrupted by the at least one forward skin structure and the at least one aft skin structure when in the open position.

Each of the at least one thrust fan can be fully covered when the at least one forward skin structure and the at least one aft skin structure are in the closed position.

The at least one thrust fan can be mounted on a frame, wherein each of the at least one forward skin structure and the at least one aft skin structure moves relative to the frame between the closed position and the open position, and wherein each of the at least one forward skin structure and the at least one aft skin structure has at least one set of engagement features that is driven by at least one pinion gear, the at least one pinion gear being driven by at least one pinion gear drive shaft.

At least one of the forward skin structure and the aft skin structure can move relative to a fuselage along at least one of a linear path, an arcuate path, a complex path, and a convolute path.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

VTOL or STOL aircraft may employ a number of different methods in order to generate the required thrust to enable vertical flight. This often includes one or more ducted or closely shrouded thrust fan units with a fan or propeller enclosed within a tightly fitting duct or shroud, the inlet of which often contains a radius of curvature optimized for intake airflow. Within these fan units the fan or propeller draws air into the inlet and forces it out of an outlet located at the opposite side of the duct. This process produces thrust along an axis approximately perpendicular to the propeller or fan disk due to a reactionary force opposing a positive momentum change imparted on the air mass through the fan unit. In a VTOL or STOL aircraft, the thrust vector from such ducted or closely shrouded fan units is normally approximately downward collectively even though each individual airfoil may in fact produce, from time to time, an instantaneously upward vertical thrust (e.g., an empennage normally produces a downward balancing force in normal aircraft as a result of an upward thrust vector during certain flight regimes).

The fan or fan units in known VTOL or STOL aircraft may be located in a number of areas of the aircraft in order to optimize aerodynamics, the centre of gravity, safety and redundancy, and other performance considerations. One such location that has been historically attempted is to locate the fans within an airfoil of an aircraft. In such an installation, these fans supplement the vertical component of flight at airspeeds below that which the normally configured wing could produce sufficient lift. When the VTOL or STOL aircraft transitions to forward flight there is often a significant aerodynamic penalty imparted due to airflow disturbances generated by the ducted or closely shrouded fan unit's open inlet. As such, it is beneficial to cover the inlet with an aerodynamically efficient surface when the aircraft fully transitions to forward flight. This surface or covering may then also retract to expose the fans when it slows from transit speeds to enter the vertical or substantially flight regime for landing.

Other known VTOL or STOL aircraft employ doors or coverings that move about a pivoting hinge and open to reveal the inlet and outlet for fan operation, or close to seal the inlet and outlet from the free stream airflow. In such a configuration, their opening mechanism requires a substantially vertical door position in the open position that will often interfere significantly with the free stream airflow, inducing aerodynamic drag.

Other known VTOL or STOL aircraft employ sliding doors or coverings that translate in a longitudinal or transverse direction to alternatively reveal the inlets and/or outlets in the open position or conceal them in the closed position. However, these translational mechanisms employ tracks and often require the doors or coverings to move substantially in a vertical direction to disengage prior to translational movement. This mechanism often raises the doors or coverings into free stream airflow, degrading the aerodynamics of the aircraft through increased drag and/or disruptions to duct fan inlet or exhaust airflow.

Still other known VTOL or STOL aircraft employ a plurality of parallel louvers that rotate about an axis to alternatively open or close the inlet and/or outlet. However, in the open position, these louvers are disposed within the inlet airflow path, thus creating significant aerodynamic disruption that decreases ducted or closely shrouded fan unit efficiency, ultimately reducing output thrust.

Disclosed herein is a novel airfoil and aircraft having the same. Two or more or more skin structures of the airfoil can be moved relative to each other between a closed position, in which at least one thrust fan of the airfoil is at least partially covered, and an open position, in which the at least one thrust fan is less covered than in the closed position.

The description of the fan-in-airfoil system that follows, and the embodiments described therein, are provided by way of illustration of an example, or examples, of particular embodiments of the principles, aspects or features of the invention. These examples are provided for the purposes of explanation, and not of limitation, of those principles and of the invention. In the description, like parts are marked throughout the specification and the drawing with the same respective reference numerals.

The terminology used in this specification is thought to be consistent with the customary and ordinary meaning of those terms as they would be understood by a person of ordinary skill in the aircraft industry in North America. The Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record, (for example, earlier publications by persons not employed by the USPTO or any other Patent Office), demonstrating how the terms are used and understood by persons of ordinary skill in the art, or by way of expert evidence of a person or persons of at least 10 years of experience in the aircraft industry in North America or equivalent.

In terms of general orientation and directional nomenclature, for aircraft described herein, the longitudinal or lengthwise direction is defined as being coincident with the fore-and-aft direction of flight of the aircraft in straight and level flight. In the case of a fixed airfoil aircraft, the longitudinal direction is parallel to the rolling direction of the wheeled landing gear. The leading direction, or leading edge lies toward the forward direction of travel; the rearward or trailing direction or trailing edge is oriented away from (i.e., backwards relative to) the normal direction of advance of the aircraft in forward flight. Unless otherwise noted, vertical, or upward and downward, are terms that use the landing terrain as a datum. Unless otherwise noted, "vertical" or "vertically" are intended to also include "substantially vertical" and "substantially vertically" respectively. In the context of the aircraft as a whole, the terms cross-wise, lateral, spanwise, or laterally outboard, or transverse, or transversely outboard refer to a distance or orientation perpendicular relative to the longitudinal centreline of the fuselage. The commonly used engineering terms "proud", "flush", and "shy" may be used herein to denote items that, respectively, protrude beyond an adjacent element, are level with an adjacent element, or do not extend as far as an adjacent element, the terms corresponding conceptually to the conditions of "greater than", "equal to", and "less than".

The directions correspond generally to a Cartesian frame of reference in which the x-direction is longitudinal, the y-direction is lateral, and the z-direction is vertical. Pitching motion is angular motion of the aircraft about a horizontal axis perpendicular to the longitudinal direction. Yawing is angular motion about a vertical axis. Roll is angular motion about the longitudinal axis. Given that the aircraft described herein may tend to have a longitudinal axis of symmetry, a description of one half of the aircraft may generally also be intended to describe the other half as well, allowing for differences between right hand and left hand parts. Also, it may be taken as a default that the basic structure of the aircraft is of aluminum fabrication with a reinforced composite surface skin, unless otherwise shown in the illustrations or indicated in the text. Other materials such as stainless steel or wood might be also used for some components.

In this discussion it may be understood that persons of ordinary skill are familiar with the aircraft construction and maintenance in North America, and may include aircraft maintenance engineers having knowledge of US Department of Transportation, Federal Aviation Administration publication EA-AC 43.13-1A & 2A "Acceptable Methods, Techniques and Practices, Aircraft Inspection and Repair", or any successor publication thereof, as updated at the date of priority filing of this specification. This specification is to be interpreted in a manner consistent with that publication.

Figure 1A:
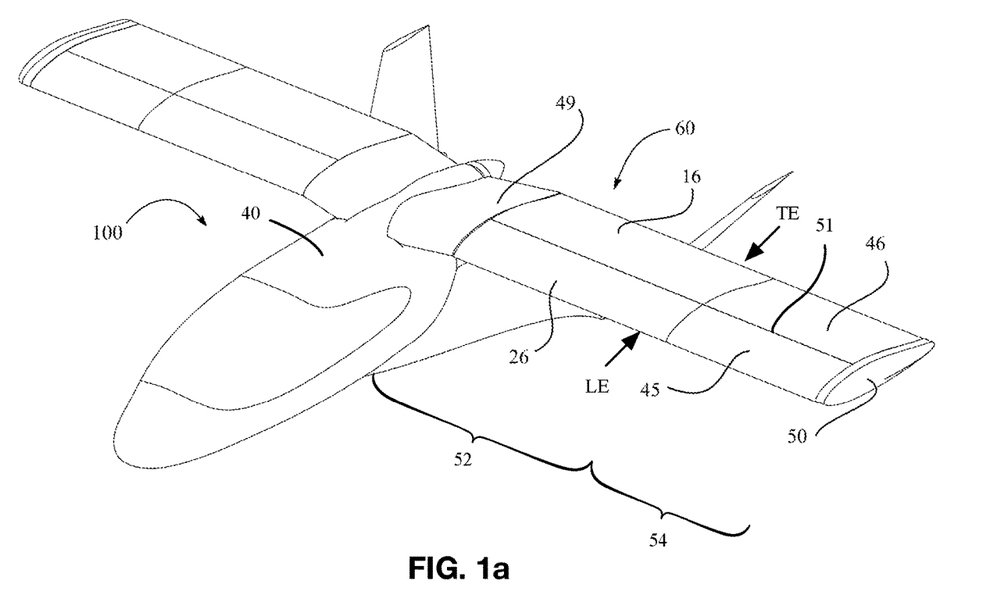
FIG. 1a is an isometric view of a VTOL or STOL aircraft in accordance with an embodiment having an airfoil in the form of a wing with two forward skin structures and two aft structural skim assemblies shown in the closed position.
Figure 1B:
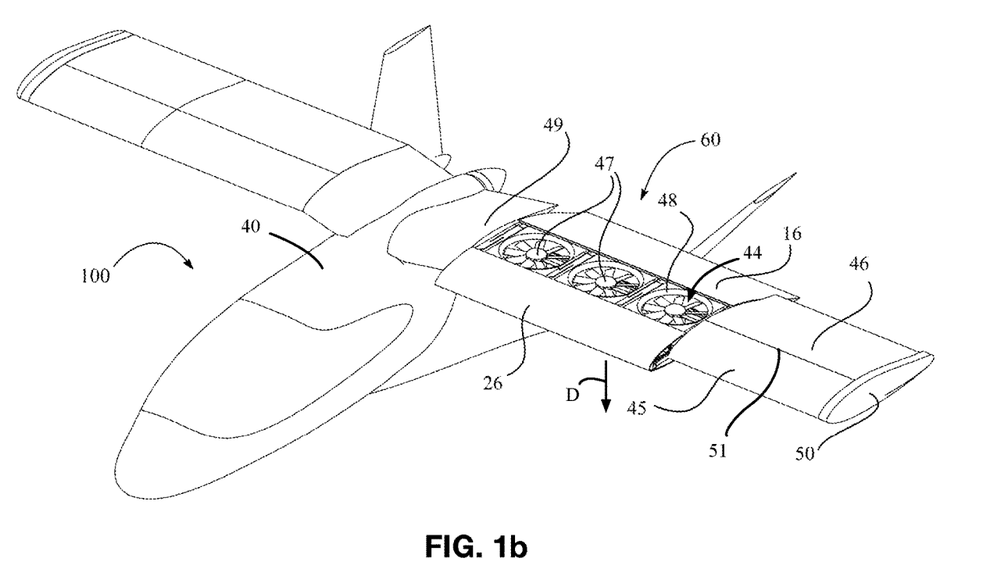
FIG. 1b is an isometric view of the VTOL or STOL aircraft of FIG. 1a wherein one of the forward skin structures and one of the aft skin structures have been moved to the open position.
Figure 1C:
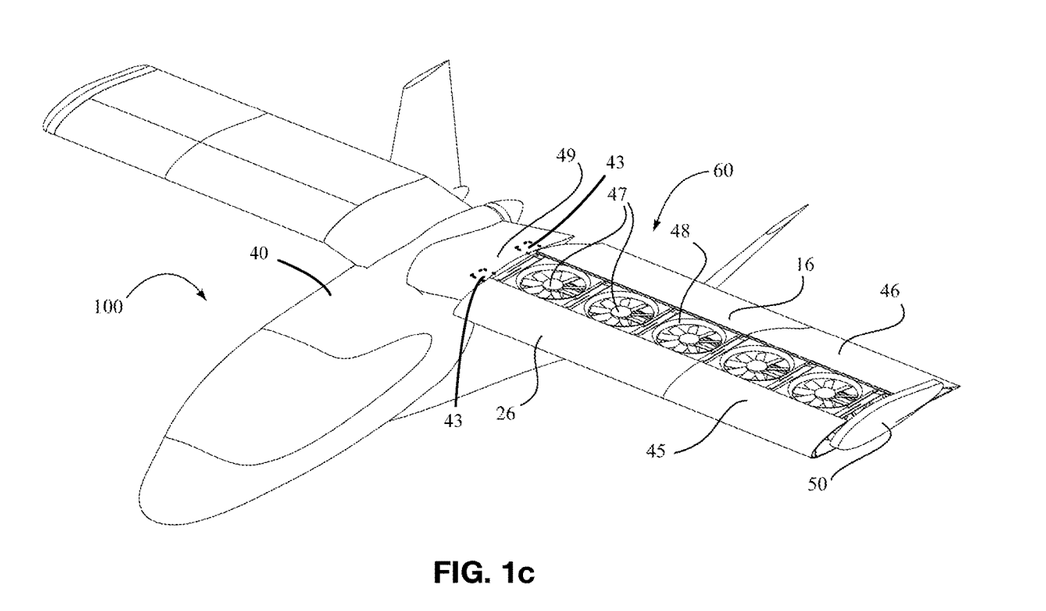
FIG. 1c is an isometric view of the VTOL or STOL aircraft of FIG. 1a wherein both of the forward skin structures and both of the aft skin structures have been moved to the open position.

FIGS. 1a to 1c show an aircraft 100 in accordance with an embodiment. The aircraft 100 is a VTOL or STOL aircraft, meaning it is capable of taking off and landing vertically, substantially vertically, or using a short horizontal surface. Although principles, aspects, and features of the invention herein may be applied to other VTOL or STOL aircraft, as may be appropriate in respect to configurations wherein there are a plurality of vertically or substantially vertically-thrusting fans located in the airfoils, it may be taken that in the embodiment illustrated in FIGS. 1a to 1c, the aircraft 100 is of a high-wing VTOL configuration with an airfoil optimized for efficient forward flight.

The aircraft 100 has a pair of constant chord cantilevered airfoils in the form of wings shown generally as 60, attached at a root 49 to a fuselage 40 of the aircraft 100.

The wing 60 has an inboard portion 52 and an outboard portion 54. The inboard portion 52 has an inboard forward skin structure 26 and an inboard aft skin structure 16. Similarly, the outboard portion 54 of the wing 60 has an outboard forward skin structure 45 and an outboard aft skin structure 46. As used herein, a skin structure is an element that forms part of the surface of the airfoil. A skin structure can be made as an assembly or can be a unitary construction. Each of the inboard forward skin structure 26 and the outboard forward skin structure 45 at least partially defines a leading edge LE of the wing 60. Likewise, each of the inboard aft skin structure 16 and the outboard aft skin structure 46 at least partially defines a trailing edge TE of the wing 60. The forward skin structures 26, 45 and the aft skin structures 16, 46 meet along a spanwise seam 51 as shown in FIG. 1a. The seam 51 extends generally linearly spanwise, but in other embodiments can extend partially spanwise along the wing 60. The skin structures 26, 16, 45, 46 each can have secondary moveable flight control surfaces or sections thereof. A specialized airfoil tip 50 is fitted and caps the assembly of the wing 60.

In other embodiments, the airfoil can have a single forward skin structure and a single aft skin structure, or more than two of each. Further, the number of forward skin structures can differ from the number of aft skin structures. For example, an airfoil can have a single forward skin structure and two aft skin structures.

Each of the inboard forward skin structure 26 and the inboard aft skin structure 16 are movable relative to the other of the inboard forward skin structure 26 and the inboard aft skin structure 16 between a closed position shown in FIG. 1a and an open position shown in FIG. 1b.

Figure 5A:
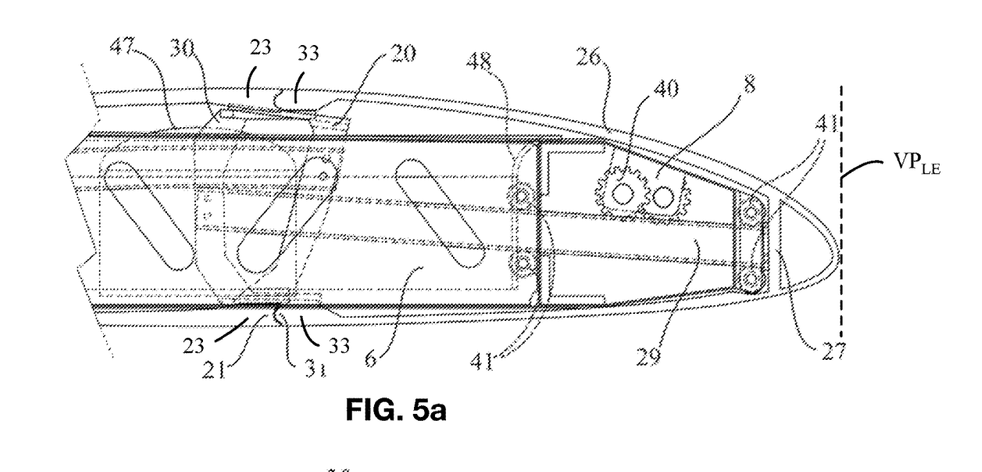
FIG. 5a is a side section view of the forward section of the airfoil depicted in FIGS. 2a and 2b shown in the closed position.
Figure 5B:
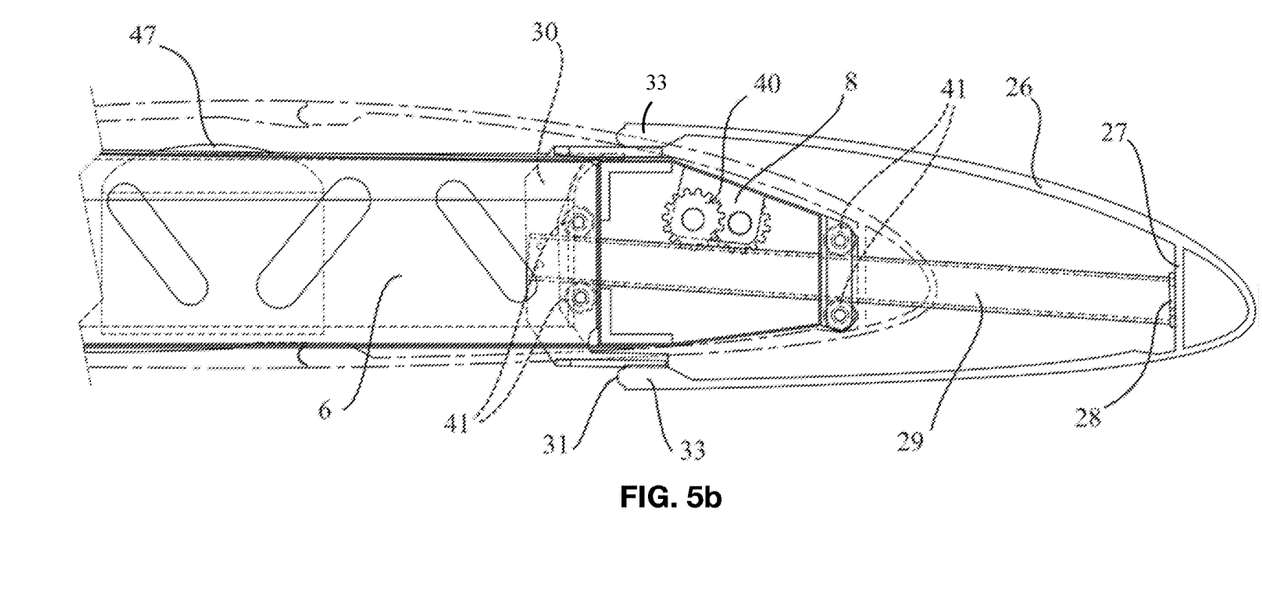
FIG. 5b is a side section view of the forward section of the airfoil depicted in FIGS. 2a and 2b shown in the open position.
Figure 5C:
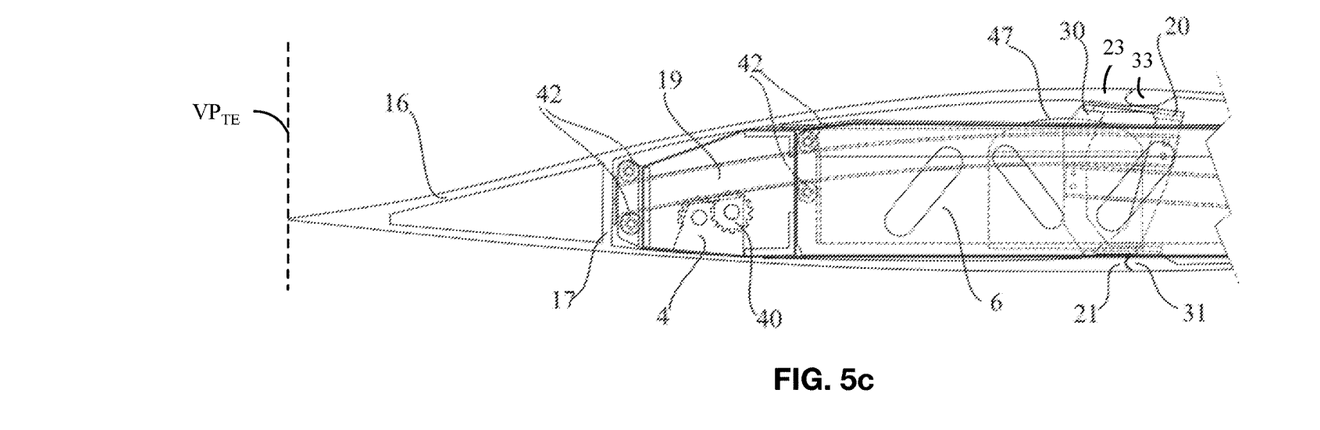
FIG. 5c is a side section view of the aft section of the airfoil depicted in FIGS. 2a and 2b shown in the closed position.
Figure 5D:
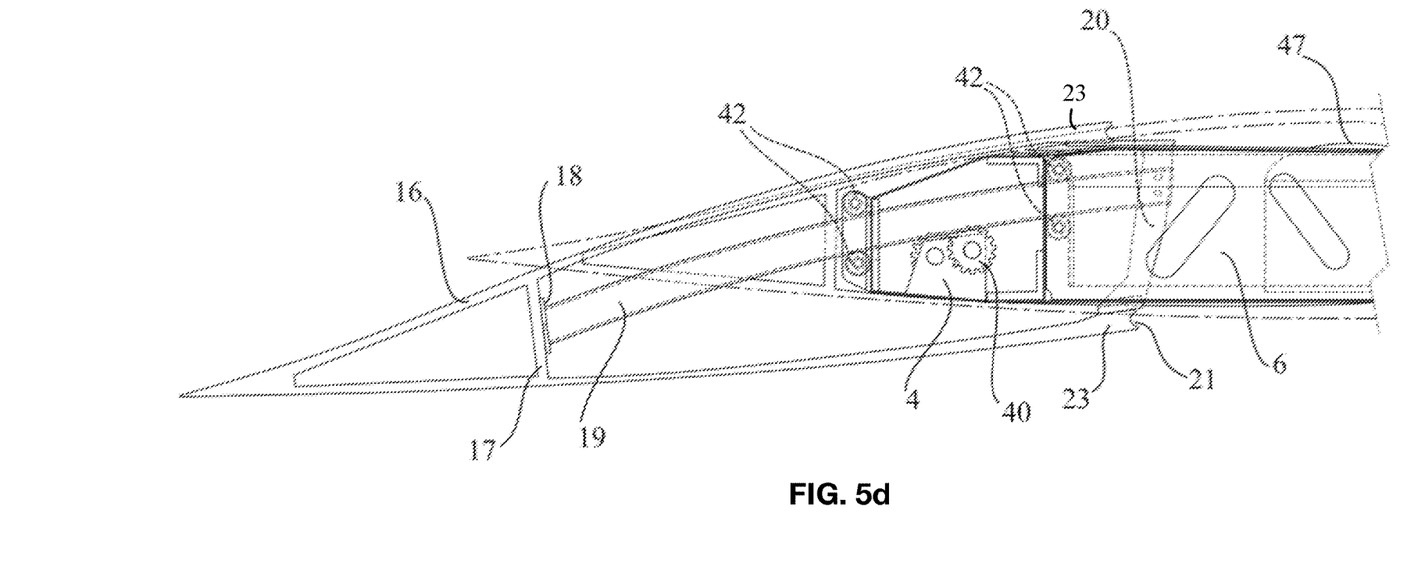
FIG. 5d is a side section view of the aft section of the airfoil depicted in FIGS. 2a and 2b shown in the open position.

The wings 60 have an array of horizontally mounted thrust fans 47 as shown in FIGS. 1b and 1 c. Each of the thrust fans 47 is positioned in a short duct 44 with an inlet lip 48 within the corresponding wing 60 in between a vertical plane $VP_{LE}$ of the leading edge LE and a vertical plane $VP_{TE}$ of the trailing edge TE (as shown in FIGS. 5a and 5c), generate an approximately vertical downward thrust component D for the wing instance, and, from time to time, instantaneously upward in canard and empennage installations, and may be electrically, pneumatically, mechanically or otherwise driven. The thrust fans 47 may be of identical dimension or vary in size so as to best fit within the internal structure of the chosen wing. The thrust fans 47 depicted herein are shown for reference only and are not specific in nature. While the thrust fans 47 illustrated in this embodiment are shown in a fixed position, orientation, and configuration so that they generate vertical or substantially vertical thrust, in other embodiments, the thrust fans 47 can also be configured to pivot or otherwise alternatively generate thrust in a substantially non-vertical direction.

Figure 2A:
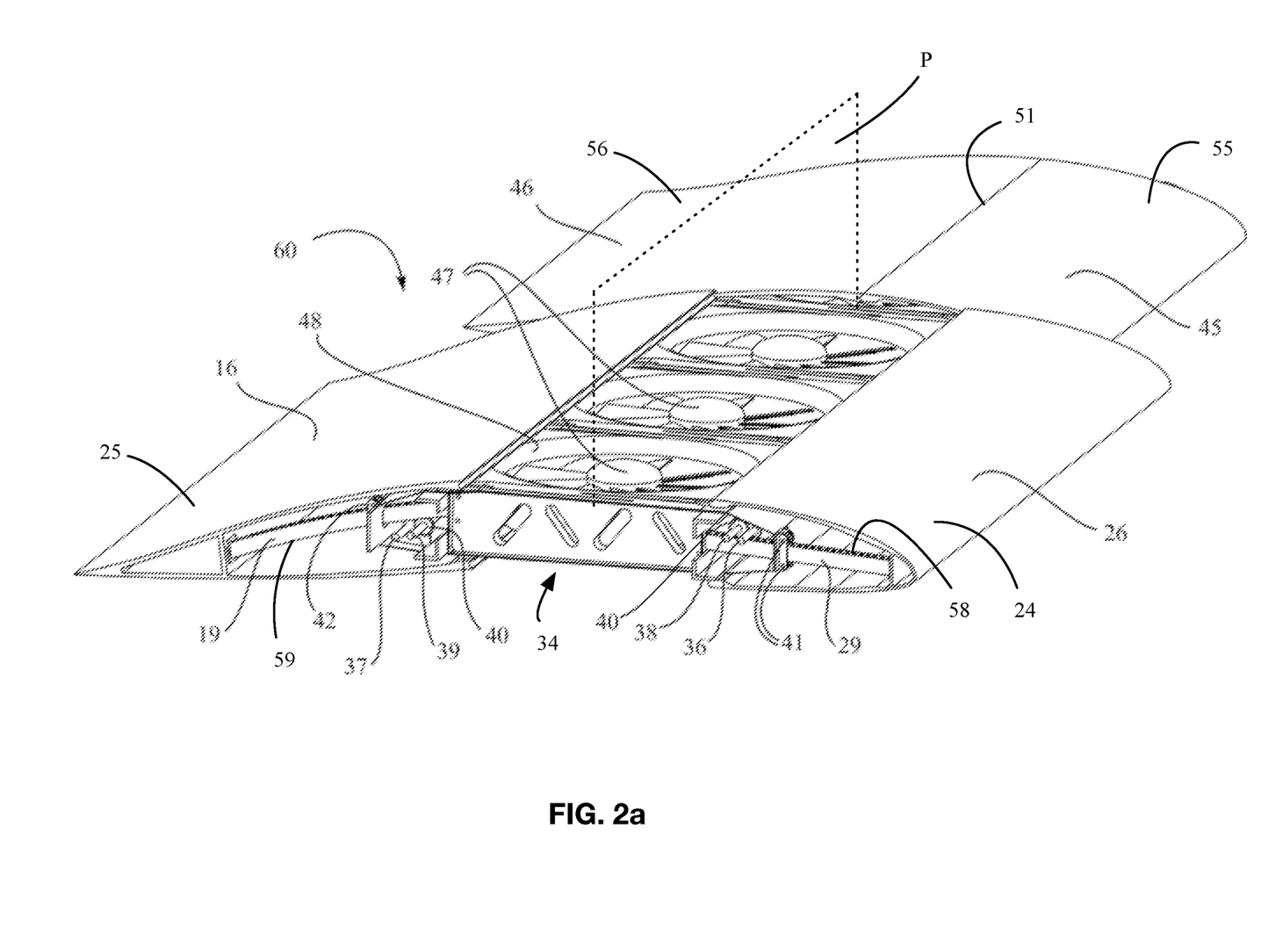
FIG. 2a is an isometric section view of a portion of the wing of the aircraft of FIG. 1a, wherein one of the forward skin structures and one of the aft skin structures have been moved to the open position.

In the closed position of the skin structures 26, 16, 45, 46 shown in FIG. 1a, the thrust fans 47 of the wing 60 is at least partially covered. In this embodiment, the inboard forward skin structure 26 and the inboard aft skin structure 16 are positioned adjacent one another at the seam 51 as shown in FIG. 1a to fully cover the thrust fans 47. The seam 51 is positioned along the central axis of the array of thrust fans 47 at approximately the mid-chord position; that is, substantially along a plane P defined by the rotation axes of the thrust fans 47 as shown in FIG. 2a. However, in other embodiments, this seam 51 may be located anywhere from just aft of the leading edge LE of the wing 60 to just forward of the trailing edge TE of the wing 60, and may or may not be substantially straight in nature, possibly tracing a convolute trajectory along the surface of the wing 60 in order to best optimize or otherwise enhance structural integrity, opening geometry, and/or aerodynamics.

The inboard forward skin structure 26 and the inboard aft skin structure 16 are movable relative to each other from between the closed position shown in FIG. 1a to an open position, in which the thrust fans 47 of the inboard portion 52 of the wing 60 are less covered than in the closed position. In this embodiment, the thrust fans 47 of the inboard portion 52 of the wing 60 are fully uncovered when the inboard forward skin structure 26 and the inboard aft skin structure 16 are in the open position.

Similarly, the outboard forward skin structure 45 and the outboard aft skin structure 46 of the outboard portion 54 of the wing 60 are movable relative to each other between a closed position shown in FIGS. 1a and 1b, and an open position shown in FIG. 1c, in which the thrust fans 47 of the outboard portion 54 of the wing 60 are less covered than in the closed position. In this embodiment, the thrust fans 47 of the outboard portion 54 of the wing 60 are fully uncovered when the outboard forward skin structure 45 and the outboard aft skin structure 46 are in the open position.

During vertical flight regimes, the skin structures 16, 26, 45, 46 are generally in the open position as shown in FIG. 1c with the array of lift fans 47 providing vertical thrust to counter the force of gravity on the aircraft 100. A transitional flight regime exists during which the aircraft 100 is accelerating from, or decelerating to, substantially vertical flight for a VTOL aircraft or slow flight for a STOL aircraft. During this transitional period, the skin structures 26, 16, 45, 46 may be fully open, fully closed, or partially deployed independently or co-dependently. That is, each of the skin structures 26, 16, 45, 46 may be moved independently. As an example, the inboard forward and aft skin structures 26 and 16 can be in an open position, and the outboard forward and aft skin structures 45 and 46 can be in a closed position, as shown in FIG. 1b. In another example, the forward skin structure 26 may move independently of movement of the aft skin structure 16. Above a maximum forward transitional speed, the skin structures 26, 16, 45, 46 are generally closed as the aircraft 100 resumes traditional wing-borne lift.

Referring now to FIG. 2a, the inboard portion 52 and the outboard portion 54 of the wing 60 of the aircraft 100 are shown, wherein the inboard forward and aft skin structures 26 and 16 are in the open position to fully expose the thrust fans 47 of the inboard portion 52, and the outboard forward and aft skin structures 45 and 46 are in the closed position. The inboard forward skin structure 26 has a skin 24 that provides an outer surface of the wing 60, and that is connected to a set of front guide arms 29, one of which is visible in the perspective shown. The front guide arms 29 extend to and are received by a frame 34 of the wing 60, and each has a set of engagement features 58 along at least one surface thereof. In this particular embodiment, the engagement features are recesses, but, in other embodiments, other types of engagement features can be employed, such as teeth of a rack. The frame 34 is secured to the fuselage 40 of the aircraft 100. A set of freely rotating forward support rollers 41 of the frame 34 receive and guide the front guide arms 29. A set of pinion gears 40 are mounted on a spanwise drive shaft 38 and engage the engagement features 58 of each of the front guide arms 29 to drive the inboard forward skin structure 26 to move between the closed position and the open position.

Similarly, the inboard aft skin structure 16 has a skin 25 that provides an outer surface of the wing 60, and that is connected to a set of rear guide arms 19, one of which is visible in the perspective shown. The rear guide arms 29 extend to and is received by the frame 34, and each has a set of engagement features 59 along one surface thereof. A set of freely rotating rear support rollers 42 of the frame 34 receive and guide the rear guide arms 19. A set of pinion gears 40 are mounted on a spanwise drive shaft 39 and engage the engagement features 58 of each of the front guide arms 29 to drive the inboard forward skin structure 26 to move between the closed position and the open position.

Figure 2B:
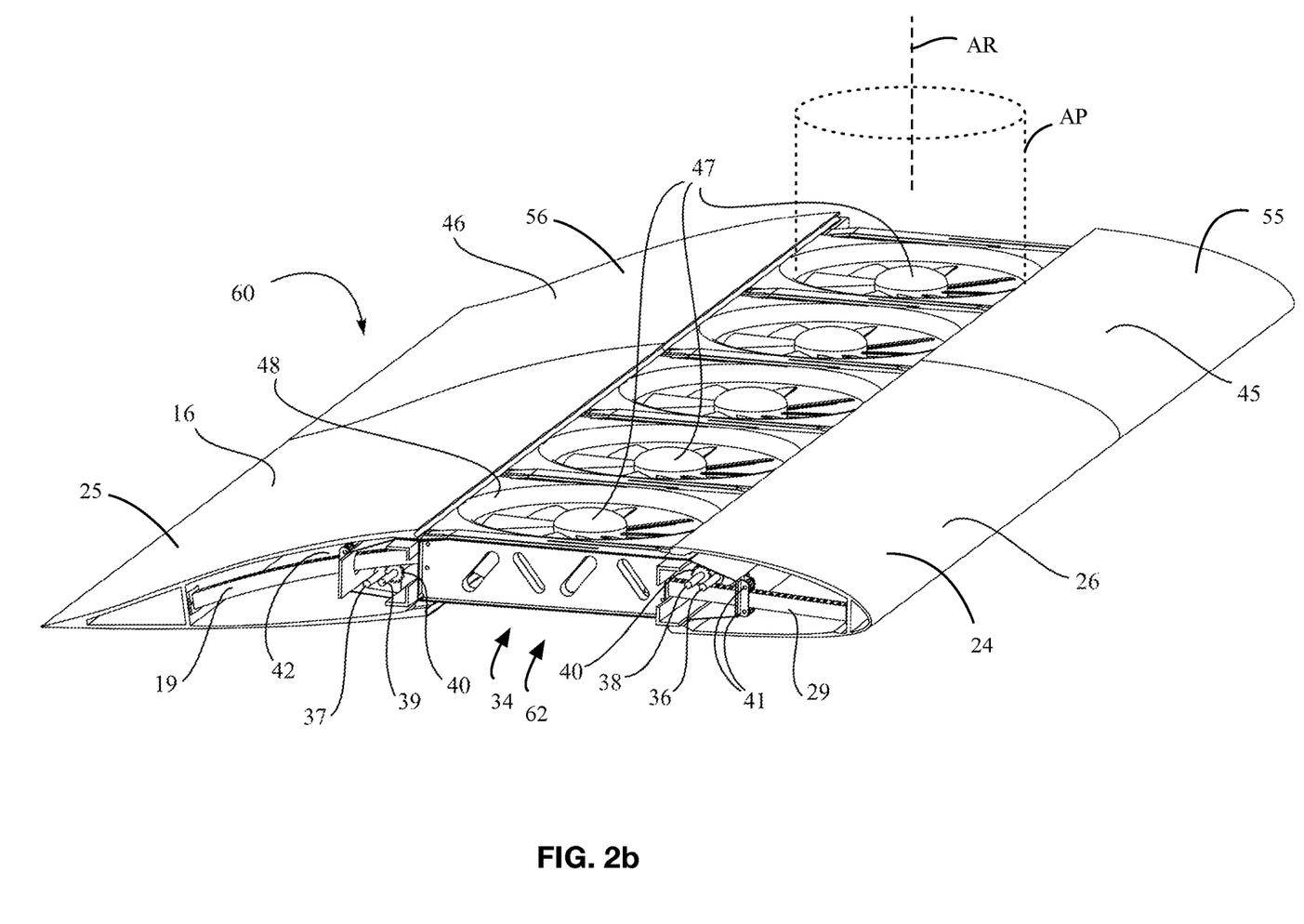
FIG. 2b is an isometric section view of a portion of the wing of the aircraft of FIG. 1a, wherein both of the forward skin structures and both of the aft skin structures have been moved to the open position.

The outboard forward and aft skin structures 45 and 46 are shown in FIG. 2*b* in the open position to fully expose the thrust fans 47 of the outboard portion 54. Similar to the inboard forward and aft skin structures 26, 16, the outboard forward and aft skin structures 45 have corresponding skins 55, 56 that provide an outer surface of the wing 60. The outboard forward skin structure 45 and the outboard aft skin structure 46 have sets of forward and rear guide arms, respectively, similar to the front guide arms 29 of the inboard forward skin structure 26 and the rear guide arms 19 of the inboard aft skin structure 16. Sets of pinion gears that engage engagement features of the forward and rear guide arms of the outboard forward skin structure 45 and the outboard aft skin structure 46 are driven by drive shafts 36, 37 respectively to move the outboard forward skin structure 45 and the outboard aft skin structure 46 between the closed position shown in FIG. 2*a* and the open position shown in FIG. 2*b*.

Rotation of the spanwise drive shafts 36, 37, 38, 39 effect and index the extension and the retraction of the skin structures 26, 16, 45, 46 and may be driven in a number of fashions including, but not limited to, electric motors 43 mounted elsewhere within the aircraft 100, as shown in FIG. 1*c*, or the wing 60 itself.

In other embodiments, more than one drive shaft, each having a set of pinion gears positioned therealong, can drive movement of each of the skin structures 26, 16, 45, 46 to reduce the load/strain on the drive shafts 36, 37, 38, 39 and to provide redundancy in case of failure of one of the drive shafts 36, 37, 38, 39.

The aforementioned forward and rear guide arms 29, 19 of the inboard forward and aft skin structures 26, 16 and the forward and rear guide arms of the outboard forward and aft skin structures 45, 46 allow the skin structures 26, 16, 45, 46 to move independently, each able to translate both along the forward and backward directions and also, to a lesser degree, in the positive and negative vertical directions due to geometry associated with the guide arms travel and/or their possibly curved shape. This opening geometry may also naturally induce a favourable rotational motion that effectively increases or decreases wing camber.

As shown in FIG. 2*b*, in the open position, an axial projection AP of the fan disk along an axis of rotation AR of each of thrust fan 47 is uninterrupted by the skin structures 26, 16, 45, 46 when the skin structures 26, 16, 45, 46 are in the open position.

Figure 3A:
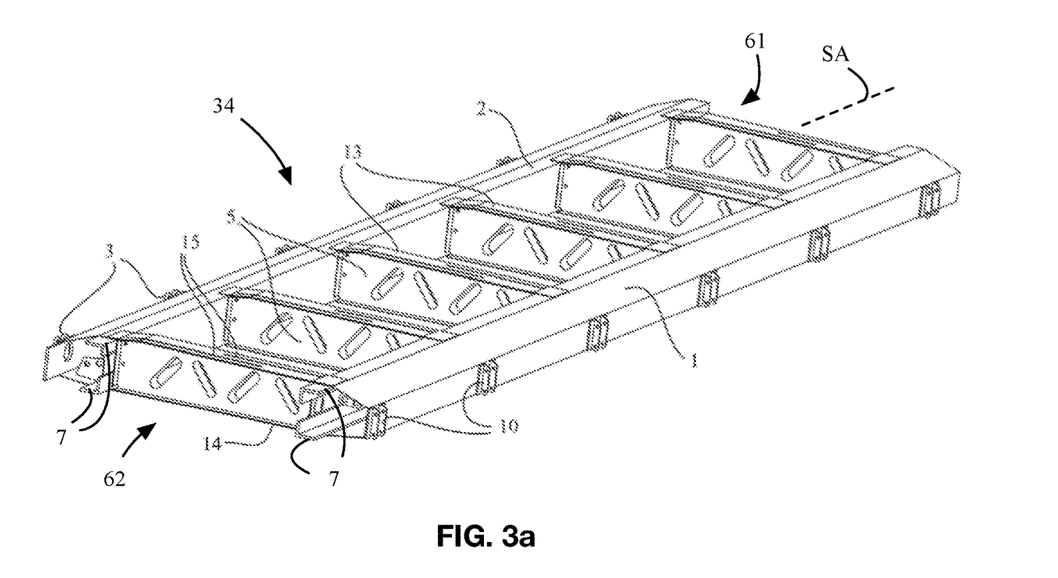
FIG. 3a is an isometric view of the underlying airfoil support structure of the wings of FIGS. 2a and 2b, including two main spanwise box beam bars that act as main spars and are connected by an array of shear ribs.
Figure 3B:
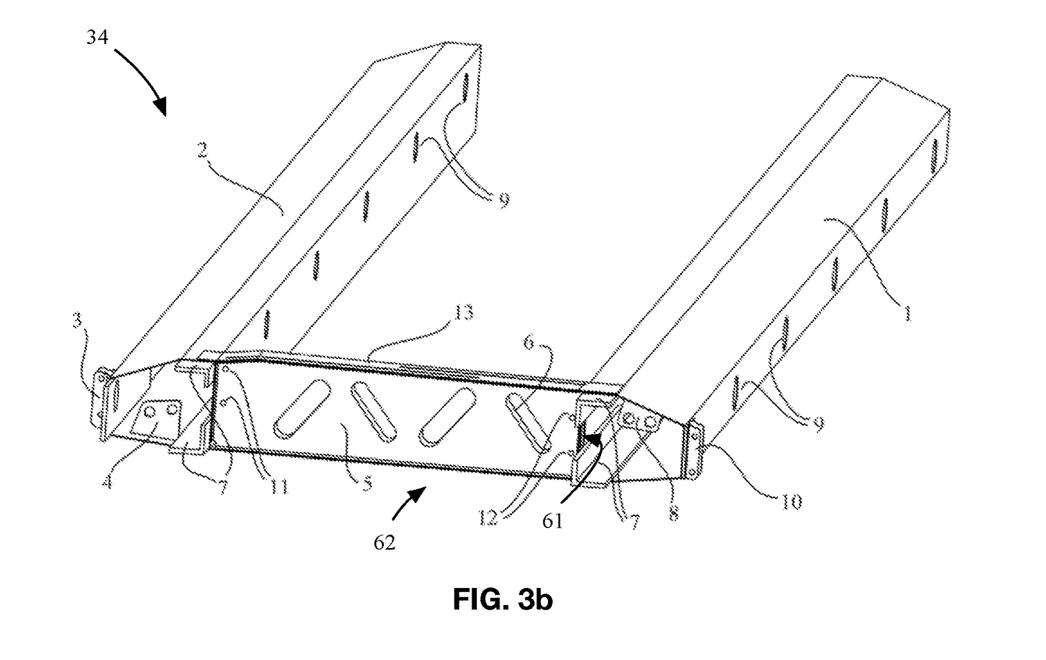
FIG. 3b is another isometric view of components of the underlying airfoil support structure of FIG. 3a that is provided for illustrating additional detail.

FIGS. 3*a* and 3*b* depict the frame 34 of the wing 60 in isolation. A forward box beam member 1 and an aft box beam member 2 support primary airfoil bending and torsion loads and are attached to the fuselage 40 of the aircraft 100 at an inboard end 62 using multiple identical upper and lower extended stub fittings 7, and extend spanwise towards an outboard end 61 of the wing 60. Each box beam member 1, 2 has multiple web through-holes 9 to allow pass-through of the front and rear guide arms 29, 19 of the forward and aft skin structures 26, 16.

The two box beam members 1, 2 are connected to each other via sets of matching pairs of inboard and outboard shear ribs 5 and 6 with sufficient separation therebetween to form channels 61 in which the forward and rear guide arms 29 and 19 translationally operate. The channels 61 extend normal or oblique to a spanwise axis of the wing 60. Upper and lower shear rib caps 13 and 14 respectively, provide a structural link between the inboard and outboard shear ribs 5, 6 of each pair. Guide slots 15 are cut in and extend along the shear rib caps 13, 14.

The forward and rear support rollers 41, 42 are located at positions 11 and 12, respectively, at intervals coinciding with the shear ribs 5 and 6 to facilitate smooth transition of the forward and rear guide arms 29, 19. The shear ribs 5, 6 are positioned at regular intervals based on design structural requirements and the chosen fan array, and the thrust fans 47 are mounted on the frame 34 via a hub attached to a structure spanning the duct or closely fitting shroud. This spanning structure is attached either to the box beam members 1, 2 directly (i.e., longitudinally) or to the shear ribs 5, 6 (i.e., in a transverse, spanwise setup).

Each box beam member 1, 2 also has forward and rear support brackets 8 and 4 respectively, spaced at regular intervals that support the array of drive shafts 36, 37, 38, 39. Furthermore, each box beam member 1, 2 contains forward and rear-facing bearing supports 10 and 3, respectively, located at intervals coinciding with the positions of the shear rib 5 and 6.

FIGS. 4*a* and 4*b*, and FIGS. 5*a*, 5*b*, 5*c* and 5*d*, will now be described with reference to the inboard forward and aft skin structures 26, 16, but it should be appreciated that the same discussion applies to the outboard forward and aft skin structures 45, 46. The rectangular cross-sectional forward and rear guide arms 29, 19 are constructed with engagement features 32, 22 in the form of recesses into which the sprocket or pinion gears 40 fit in order to drive the forward and aft motion of the structural airfoil skin assemblies 26, 16. In an alternative embodiment, a rack gear or tooth belt may be mounted and used in similar fashion to drive the guide arms 29, 19. To illustrate design flexibility, in the presented embodiment the forward skin structures 26, 45 use a straight guide arm 29 while the aft skin structures 16, 46 use a rear guide arm 19 that is curved in one dimension with a suitable radius. These guide arms 19, 29 may also be curved in multiple axes in order to create a convolute track along which the skin structures 26, 16, 45, 46 may track to produce alternative opening geometries. Thus, the skin structures 26, 16, 45, 46 can move relative to the frame 34 and the fuselage 40, and thus relative to the corresponding skin structure 26, 16, 45, 46, along a linear, arcuate, complex, and/or convolute path.

Figure 4A:
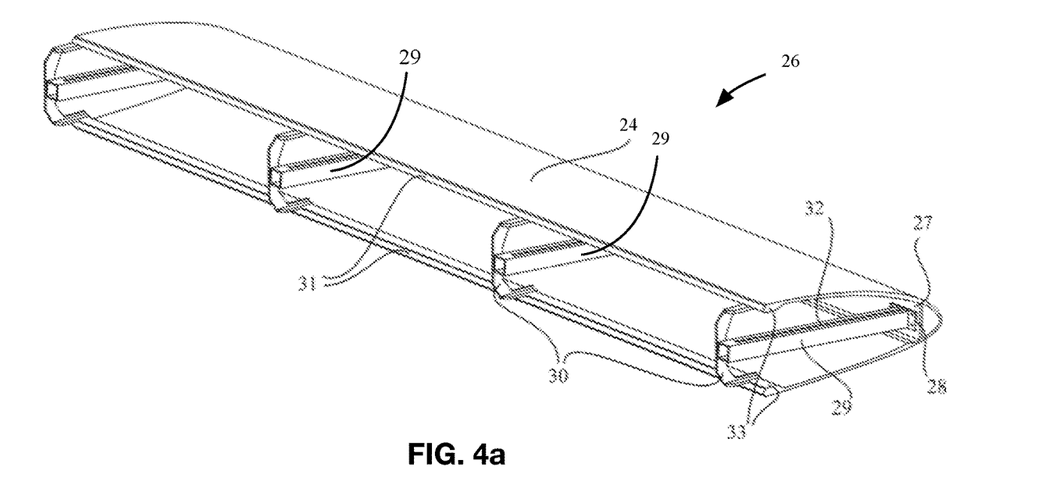
FIG. 4a is an isometric view of one of the forward skin structures of FIGS. 2a and 2b that is connected to the underlying airfoil support structure of FIGS. 3a and 3b.
Figure 4B:
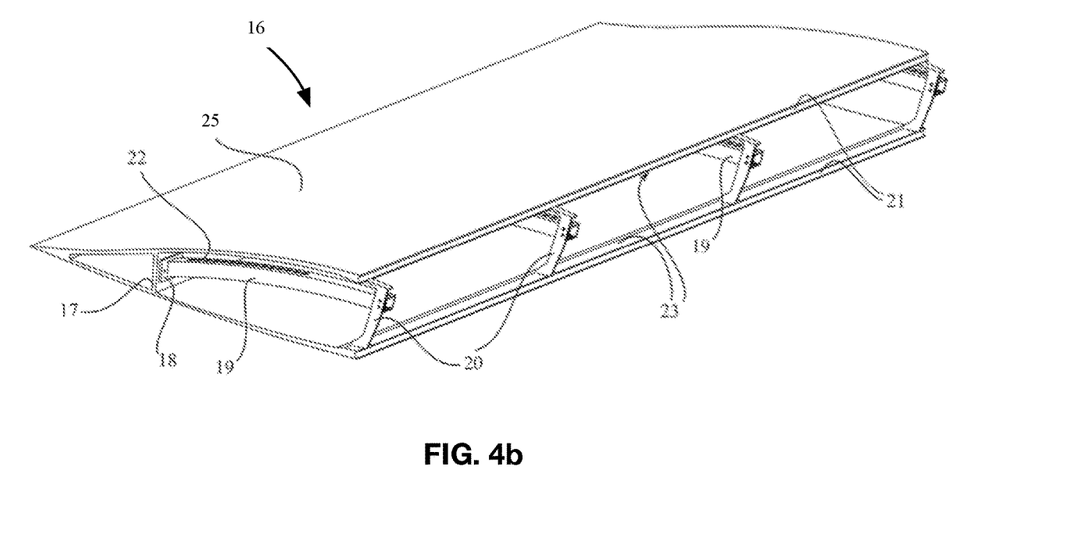
FIG. 4b is an isometric view of one of the aft skin structures of FIGS. 2a and 2b that is connected to the underlying airfoil support structure of FIGS. 3a and 3b.

The forward guide arms 29 affix to the skin 24 via a mounting bracket 28 secured to a forward skin shear web 27. Similarly, the rear guide arm 19 is secured to the skin 25 via a mounting bracket 18 to a rear cover shear web 17. These interfaces are attached in a fashion that allows for tolerances required during thermal expansion of structural airfoil skin assemblies 16, 26.

It is advantageous for the aerodynamics of the wing 60 to provide a robust seal between the skin structures 26, 16, 45, 46 when in the closed position in order to prevent or mitigate negative aerodynamic and/or physical artifacts such as air leakage and/or water leakage into the internal airfoil mechanisms. As such, free-edge spanwise stiffeners 33 and 23 are located on the upper and lower edges of the forward and aft structural airfoil skin assemblies 26, 45 and 16, 46 respectively. Furthermore, the forward and aft skin structures 26, 16, 45, 46 have interlocking features for engaging each other to limit relative movement of the forward skin structures 26, 45 and the aft skin structures 16, 46 when in the closed position. In particular, the forward skin structures 26, 45 have forward mating edges 31 and the aft skin structures 16, 46 have rear mating edges 21 that are shaped in such a way that their taper, bevel, half-round, or other unique shape create an interlocking link when nested together, providing exterior surface alignment and weather seal between the forward skin structures 26, 45 and the aft skin structures 16, 46 when engaged.

Support for the free edges of the skin structures 26, 16, 45, 46 is provided in order to minimize vibrational modes during flight. As such, cross-tie brackets 30 and 20 join the forward and rear guide arms 29, 19 to the forward and rear spanwise stiffeners 33, 23 to provide the necessary rigidity to brace the forward skin structures 26, 45 and the aft skin structures 16, 46, respectively. These cross-tie brackets 30, 20 are positioned between the forward and aft box beam members 1, 2, and slotted into the guide slots 15 along the shear rib caps 13, 14 to maintain alignment of the skin structures 26, 16, 45, 46 in a spanwise direction. In this manner, air and/or water leakage between the airfoil surfaces can be inhibited.

In order to eliminate interference between the cross-tie brackets 30, 20, the cross-tie brackets 30 of the forward skin structures 26, 45 are positioned on the outboard side of the guide arms 29, and the cross-tie brackets 20 of the aft skin structures 16, 46 are positioned on the inboard side of the guide arms 19. Abutment of the cross-tie brackets 30, 20 with the front and rear support rollers 41, 42 positioned at positions 11, 12 limits travel of the forward and aft skin structures 26, 16, 45, 46 when in the open position.

In other embodiments, various other interlocking features can be employed. For example, the forward and aft skin structures can have interlacing fingers that restrict relative movement of the assemblies much like the fingers of two hands when clasped.

In the above-described and illustrated embodiment, both of the skin structures move relative to the frame and the thrust fans and are positioned adjacent one another along a seam that is generally aligned with the axes of rotation of the thrust fans to fully cover the thrust fans in the closed position. In other embodiments, the seam between the skin structures may be positioned forward or rearward of the axes of rotation of the thrust fans. In another embodiment, one of the forward and aft skin structures may be fixed relative to the frame and the other of the forward and aft skin structures can move relative to the frame. In this embodiment, the moving skin structure can cover all or most of the thrust fan(s) in the closed position and can be moved to an open position in which more or all of the thrust fan(s) is exposed.

In some applications, the thrust fan(s) can pivot relative to the frame and the fuselage to provide thrusting force along more than one axis/vector. Thus, the thrust fans can provide both vertical and at least partially horizontal thrust.

While it would be readily understood by a person skilled in the art, the airfoil design can be used for both manned craft and unmanned craft, such as reconnaissance aircraft.

The airfoil design disclosed herein can also be used for hydrofoils of watercraft or any other type of craft that moves through a fluid. It will be appreciated that the construction of hydrofoils can be adjusted to seal some components from water ingress.

While, in the above embodiments, more than one thrust fans are illustrated, it will be appreciated that in some applications, only one thrust fan can be employed.

The inventive principles described and illustrated with respect to the wing of the aircraft can also be applied to other airfoils of an aircraft, such as canards and empennages.

It may be understood that the various aspects and features may be mixed and matched as may be appropriate. It may also be understood that the foregoing is not intended to be an exhaustive listing of aspects and features of the invention. These and other aspects and features of the invention may be understood with reference to the description which precedes, and with the aid of the illustrations provided.

Various embodiments have been described in detail. Since changes in, and/or additions to, the above-described examples may be made without departing from the nature, spirit, or scope of the invention, the invention is not to be limited to those details.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS 1 forward box beam member
2 aft box beam member
3 rear-facing bearing support
4 rear support bracket
5 inboard shear rib
6 outboard shear rib
7 stub fitting
8 forward support bracket
9 through-hole
10 forward-facing bearing support
11 position
12 position
13 upper shear rib cap
14 lower shear rib cap
15 guide slot
16 aft skin structure
17 rear cover shear web
18 mounting bracket
19 rear guide arm
20 aft cross-tie bracket
21 rear mating edge
22 slots
23 stiffener
24 skin
25 skin
26 forward skin structure
27 forward skin shear web
28 mounting bracket
29 forward guide arm
30 forward cross-tie bracket
31 forward mating edge
32 slots
33 stiffener
34 frame 36, 37, 38, 39 drive shaft
40 pinion gear
41 forward support rollers
42 rear support rollers
44 duct
45 forward skin structure
46 aft skin structure
47 thrust fan
48 inlet lip
49 root
50 airfoil tip
51 seam
52 inboard portion
54 outboard portion
55 skin
56 skin
58 rack
59 rack
60 wing
61 outboard end
62 inboard end
100 aircraft
AP axial projection
AR axis of rotation
LE leading edge
P plane
SA spanwise axis
TE trailing edge

What is claimed is:

1. An aircraft airfoil comprising a forward skin structure having a leading edge at least partially defining a leading edge of the airfoil and an aft skin structure having a trailing edge at least partially defining a trailing edge of the airfoil, at least one of the forward skin structure and the aft skin structure being movable relative to the other of the forward skin structure and the aft skin structure between a closed position, in which at least one thrust fan positioned between the leading edge and the trailing edge of the airfoil is at least partially covered, and an open position at a range-of-movement limit of the at least one of the forward skin structure and the aft skin structure, in which the at least one thrust fan is less covered than in the closed position, wherein, in the open position:
    the leading edge of the forward skin structure is located generally along a fore-and-aft direction relative to a location of the leading edge of the forward skin structure in the closed position; and/or
    the trailing edge of the aft skin structure is located generally along a fore-and-aft direction relative to a location of the trailing edge of the aft skin structure in the closed position.

2. The aircraft airfoil of claim 1, wherein the forward skin structure and the aft skin structure are positioned adjacent one another along a seam in the closed position.

3. The aircraft airfoil of claim 2, wherein the seam extends at least partially spanwise along the airfoil.

4. The aircraft airfoil of claim 2, where at least one of the forward skin structure and the aft skin structure has an interlocking feature for engaging the other of the forward skin structure and the aft skin structure when the forward skin structure and the aft skin structure are moved toward one another in a direction that is parallel to a skin surface of the forward skin structure and the aft skin structure to limit relative movement of the forward skin structure and the aft skin structure normal to the skin surface of the forward skin structure and the aft skin structure when in the closed position.

5. The aircraft airfoil of claim 1, wherein each of the forward skin structure and the aft skin structure moves relative to the at least one thrust fan between the closed position and the open position.

6. The aircraft airfoil of claim 1, wherein the at least one thrust fan is mounted on a frame over which the at least one of the forward skin structure and the aft skin structure move.

7. The aircraft airfoil of claim 6, wherein the frame has a set of channels extending normal or oblique to a spanwise axis of the airfoil in which are positioned a set of guide arms of the at least one of the forward skin structure and the aft skin structure.

8. The aircraft airfoil of claim 7, wherein the frame has a pair of spanwise-extending members having pairs of ribs spanning therebetween, each pair defining one of the set of channels therebetween.

9. The aircraft airfoil of claim 6, wherein the at least one of the forward skin structure and the aft skin structure has at least one set of engagement features that is engaged and driven by at least one pinion gear, the at least one pinion gear being driven by at least one drive shaft.

10. The aircraft foil of claim 1, wherein an axial projection of the fan disk of along a rotational axis of each of the at least one thrust fan is uninterrupted by the forward skin structure and the aft skin structure when in the open position.

11. The aircraft foil of claim 1, wherein each of the at least one thrust fan is fully covered when the forward skin structure and the aft skin structure are in the closed position.

12. The aircraft airfoil of claim 1, further comprising an additional forward skin structure having a leading edge at least partially defining the leading edge of the airfoil and an additional aft skin structure having a trailing edge at least partially defining the trailing edge of the airfoil, at least one of the additional forward skin structure and the additional aft skin structure being movable relative to the other of the additional forward skin structure and the additional aft skin structure between a closed position, in which at least one additional thrust fan of the airfoil is at least partially covered, and an open position at a range-of-movement limit of the at least one of the additional forward skin structure and the additional aft skin structure, in which the at least one additional thrust fan is less covered than in the closed position, wherein, in the open position:
    the leading edge of the forward skin structure is located generally along a fore-and-aft direction relative to a location of the leading edge of the forward skin structure in the closed position; and/or
    the trailing edge of the aft skin structure is located generally along a fore-and-aft direction relative to a location of the trailing edge of the aft skin structure in the closed position.

13. The aircraft airfoil of claim 12, wherein the at least one thrust fan and the at least one additional thrust fan are mounted on a frame, wherein each of the forward skin structure and the aft skin structure moves relative to the frame between the closed position and the open position, wherein each of the additional forward skin structure and the aft skin structure moves relative to the frame between the closed position and the open position, and wherein each of the forward skin structure, the aft skin structure, the additional forward skin structure, and the additional aft skin structure has at least one set of engagement features that is driven by at least one pinion gear, the at least one pinion gear being driven by at least one pinion gear drive shaft.

14. The aircraft airfoil of claim 1, wherein at least one of the forward skin structure and the aft skin structure moves relative to a fuselage along at least one of a linear path, an arcuate path, and a convolute path.

15. An aircraft comprising an airfoil having a forward skin structure having a leading edge at least partially defining a leading edge of the airfoil and an aft skin structure having a trailing edge at least partially defining a trailing edge of the airfoil, at least one of the forward skin structure and the aft skin structure being movable relative to the other of the forward skin structure and the aft skin structure between a closed position, in which at least one thrust fan positioned between the leading edge and the trailing edge of the airfoil is at least partially covered, and an open position at a range-of-movement limit of the at least one of the forward skin structure and the aft skin structure, in which the at least one thrust fan is less covered than in the closed position, wherein, in the open position:
the leading edge of the forward skin structure is located generally along a fore-and-aft direction relative to a location of the leading edge of the forward skin structure in the closed position; and/or
the trailing edge of the aft skin structure is located generally along a fore-and-aft direction relative to a location of the trailing edge of the aft skin structure in the closed position.

16. The aircraft of claim 15, wherein the forward skin structure and the aft skin structure are positioned adjacent one another along a seam in the closed position.

17. The aircraft of claim 16, wherein the seam extends at least partially spanwise along the airfoil.

18. The aircraft of claim 16, where at least one of the forward skin structure and the aft skin structure has an interlocking feature for engaging the other of the forward skin structure and the aft skin structure when the forward skin structure and the aft skin structure are moved toward one another in a direction that is parallel to a skin surface of the forward skin structure and the aft skin structure to limit relative movement of the forward skin structure and the aft skin structure normal to the skin surface of the forward skin structure and the aft skin structure when in the closed position.

19. The aircraft of claim 15, wherein each of the forward skin structure and the aft skin structure moves relative to the at least one thrust fan between the closed position and the open position.

20. The aircraft of claim 15, wherein the at least one thrust fan is mounted on a frame over which the at least one of the forward skin structure and the aft skin structure move.

21. The aircraft of claim 20, wherein the frame has a set of channels extending normal or oblique to a spanwise axis of the airfoil in which are positioned a set of guide arms of the at least one of the forward skin structure and the aft skin structure.

22. The aircraft of claim 21, wherein the frame has a pair of longitudinal members having pairs of ribs spanning therebetween, each pair defining one of the set of channels therebetween.

23. The aircraft of claim 20, wherein the at least one of the forward skin structure and the aft skin structure has at least one set of engagement features that is driven by at least one pinion gear, the at least one pinion gear being driven by at least one pinion gear drive shaft.

24. The aircraft of claim 15, wherein an axial projection of the fan disk of along a rotational axis of each of the at least one thrust fan is uninterrupted by the forward skin structure and the aft skin structure when in the open position.

25. The aircraft of claim 15, wherein each of the at least one thrust fan is fully covered when the forward skin structure and the aft skin structure are in the closed position.

26. The aircraft of claim 15, further comprising an additional forward skin structure having a leading edge at least partially defining the leading edge of the airfoil and an additional aft skin structure having a trailing edge at least partially defining the trailing edge of the airfoil, at least one of the additional forward skin structure and the additional aft skin structure being movable relative to the other of the additional forward skin structure and the additional aft skin structure between a closed position, in which at least one additional thrust fan of the airfoil is at least partially covered, and an open position at a range-of-movement limit of the at least one of the additional forward skin structure and the additional aft skin structure, in which the at least one additional thrust fan is less covered than in the closed position, wherein, in the open position:
the leading edge of the forward skin structure is located generally along a fore-and-aft direction relative to a location of the leading edge of the forward skin structure in the closed position; and/or
the trailing edge of the aft skin structure is located generally along a fore-and-aft direction relative to a location of the trailing edge of the aft skin structure in the closed position.

27. The aircraft of claim 26, wherein the at least one thrust fan and the at least one additional thrust fan are mounted on a frame, wherein each of the forward skin structure and the aft skin structure moves relative to the frame between the closed position and the open position, wherein each of the additional forward skin structure and the aft skin structure moves relative to the frame between the closed position and the open position, and wherein each of the forward skin structure, the aft skin structure, the additional forward skin structure, and the additional aft skin structure has at least one set of engagement features that is driven by at least one pinion gear, the at least one pinion gear being driven by at least one pinion gear drive shaft.

28. The aircraft of claim 15, wherein at least one of the forward skin structure and the aft skin structure moves relative to a fuselage along at least one of a linear path, an arcuate path, and a convolute path.

* * * * *